United States Patent
Araki

(10) Patent No.: US 10,584,269 B2
(45) Date of Patent: *Mar. 10, 2020

(54) ADHESIVE COMPOSITION AND PRODUCTION METHOD THEREFOR

(71) Applicant: The Yokohama Rubber Co., LTD., Minato-ku, Tokyo (JP)

(72) Inventor: Kiminori Araki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 66 days.

This patent is subject to a terminal disclaimer.

(21) Appl. No.: 15/745,700

(22) PCT Filed: Jul. 15, 2016

(86) PCT No.: PCT/JP2016/070995
§ 371 (c)(1),
(2) Date: Jan. 17, 2018

(87) PCT Pub. No.: WO2017/014185
PCT Pub. Date: Jan. 26, 2017

(65) Prior Publication Data
US 2018/0208814 A1    Jul. 26, 2018

(30) Foreign Application Priority Data

Jul. 17, 2015  (JP) .................. 2015-143179

(51) Int. Cl.
| | |
|---|---|
| *C08G 18/10* | (2006.01) |
| *C08G 18/16* | (2006.01) |
| *C08G 18/18* | (2006.01) |
| *C08G 18/20* | (2006.01) |
| *C08G 18/24* | (2006.01) |
| *C08G 18/30* | (2006.01) |
| *C08G 18/38* | (2006.01) |
| *C08G 18/48* | (2006.01) |
| *C08G 18/73* | (2006.01) |
| *C08G 18/76* | (2006.01) |
| *C09J 11/04* | (2006.01) |
| *C09J 11/06* | (2006.01) |
| *C09J 175/04* | (2006.01) |
| *C09J 175/12* | (2006.01) |

(52) U.S. Cl.
CPC ............ *C09J 175/12* (2013.01); *C08G 18/10* (2013.01); *C08G 18/165* (2013.01); *C08G 18/1808* (2013.01); *C08G 18/2081* (2013.01); *C08G 18/24* (2013.01); *C08G 18/242* (2013.01); *C08G 18/246* (2013.01); *C08G 18/30* (2013.01); *C08G 18/38* (2013.01); *C08G 18/3893* (2013.01); *C08G 18/4812* (2013.01); *C08G 18/4825* (2013.01); *C08G 18/4829* (2013.01); *C08G 18/73* (2013.01); *C08G 18/7671* (2013.01); *C09J 11/04* (2013.01); *C09J 11/06* (2013.01); *C09J 175/04* (2013.01)

(58) Field of Classification Search
CPC .. C08G 18/10; C08G 18/165; C08G 18/1808; C08G 18/242; C08G 18/3893; C08G 18/73; C08G 18/4825; C08G 18/4829; C08G 18/7671; C08G 18/2081; C08G 18/246; C08G 18/4812; C08G 18/24; C08G 18/30; C08G 18/38; C09J 175/12; C09J 175/04; C09J 11/04; C09J 11/06
See application file for complete search history.

(56) References Cited

U.S. PATENT DOCUMENTS

| | | | | |
|---|---|---|---|---|
| 5,852,137 | A * | 12/1998 | Hsieh | C08G 18/10 525/458 |
| 6,133,395 | A | 10/2000 | Miyata et al. | |
| 6,657,035 | B1 * | 12/2003 | Nakata | C08G 18/10 528/18 |
| 2006/0111516 | A1 | 5/2006 | Schumacher | |
| 2007/0179242 | A1 | 8/2007 | Landon | |
| 2016/0137815 | A1 | 5/2016 | Araki et al. | |
| 2017/0158927 | A1 | 6/2017 | Araki | |
| 2018/0134932 | A1 * | 5/2018 | House | C08G 18/12 |
| 2018/0208815 | A1 * | 7/2018 | Araki | C08G 18/10 |

FOREIGN PATENT DOCUMENTS

| | | |
|---|---|---|
| JP | 2000-128949 | 5/2000 |
| JP | 2001-059008 | 3/2001 |
| JP | 2005-530016 | 10/2005 |
| JP | 2009-525387 | 7/2009 |
| WO | WO 2001/53423 | 7/2001 |
| WO | WO 2004/000906 | 12/2003 |
| WO | WO 2007/089705 | 8/2007 |
| WO | WO 2014/203750 | 12/2014 |
| WO | WO 2016/006501 | 1/2016 |

OTHER PUBLICATIONS

International Search Report for International Application No. PCT/JP2016/070995 dated Sep. 13, 2016, 4 pages, Japan.

* cited by examiner

*Primary Examiner* — Patrick D Niland
(74) *Attorney, Agent, or Firm* — Thorpe North & Western

(57) ABSTRACT

The present technology provides: a one-part moisture-curable adhesive composition including: a preliminary composition obtained by mixing a urethane prepolymer, an aliphatic isocyanate A, and an aminosilane compound B, and a dimethyl tin catalyst represented by Formula (1) below; and a production method thereof. In Formula (1), $X_1$ and $X_2$ each independently represent a divalent heteroatom, and $R_1$ and $R_2$ each independently represent a hydrocarbon group that may have a heteroatom.

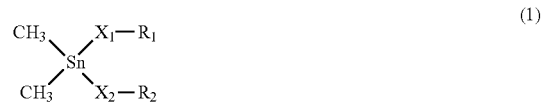

(1)

13 Claims, No Drawings

ADHESIVE COMPOSITION AND PRODUCTION METHOD THEREFOR

TECHNICAL FIELD

The present technology relates to an adhesive composition and a method of producing the same.

BACKGROUND ART

Various urethane resin compositions have been widely used as sealing agents, adhesive agents, and the like.

As such urethane resin compositions, in recent years, use of one-part moisture-curable polyurethane composition that is cured by moisture in air or the like has been increased from the perspectives of ease in handling that does not require mixing/adjustment of the composition on site, and the like.

For example, Japanese Unexamined Patent Publication No. 2000-128949 describes "a one-part moisture curable polyurethane composition comprising: (A) a urethane prepolymer; and (B) a silane compound containing an average of at least 1.5 NCO groups, and an average of at least 1.5 hydrolyzable alkoxy groups in each molecule, the silane compound being at least one type selected from the group consisting of (B-1) a silane compound prepared by an addition reaction of a polyisocyanate compound having at least 3 NCO groups and a secondary aminoalkoxysilane in each molecule, wherein the polyisocyanate compound is prepared by a reaction of a polyol that has a molecular weight of 500 or less and that is a triol or higher polyol, and diisocyanate and (B-2) a silane compound that has a lysine skeleton, and that is prepared by an addition reaction of a lysine isocyanate having 2 or 3 isocyanate groups with a secondary aminoalkoxysilane" (Japanese Unexamined Patent Publication No. 2000-128949). Furthermore, Japanese Unexamined Patent Publication No. 2000-128949 also describes that the composition may contain a curing promoter such as dioctyltin dilaurate and dibutyltin laurate.

When the inventor of the present technology produced a composition containing a compound, in which a tin atom-bonded alkyl group has 2 or more carbon atoms, such as dioctyltin dilaurate and dibutyltin laurate using Japanese Unexamined Patent Publication No. 2000-128949 as a reference and performed evaluation using this composition to a poorly adhesive coated plate including no primer, it was found that such a composition may have low adhesion to a poorly adhesive coated plate.

SUMMARY

The present technology provides an adhesive composition having excellent adhesion to a poorly adhesive coated plate.

The inventor of the present technology found that excellent adhesion to a poorly adhesive coated plate is achieved by allowing a preliminary composition obtained by mixing a urethane prepolymer, an aliphatic isocyanate A, and an aminosilane compound B, and a predetermined catalyst to be contained. That is, the present technology can be described by the following features.

1. A one-part moisture-curable adhesive composition containing:
a preliminary composition obtained by mixing a urethane prepolymer, an aliphatic isocyanate A, and an aminosilane compound B; and
a dimethyl tin catalyst represented by Formula (1):

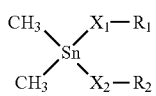

where, $X_1$ and $X_2$ each independently represent a divalent heteroatom, and $R_1$ and $R_2$ each independently represent a hydrocarbon group that may have a heteroatom.

2. The adhesive composition according to 1 above, where the divalent heteroatom is at least one type selected from the group consisting of an oxygen atom and a sulfur atom.

3. The adhesive composition according to 1 or 2 above, where the $X_1$ moiety and the $X_2$ moiety are sulfur atoms, and the $R_1$ moiety and the $R_2$ moiety are unsubstituted or ester bond-containing alkyl groups.

4. The adhesive composition according to 1 or 2 above, where the $X_1$ moiety and the $X_2$ moiety are oxygen atoms, and the $R_1$ moiety and the $R_2$ moiety are carbonyl group-containing alkyl groups.

5. The adhesive composition according to any one of 1 to 4 above, where a content of the dimethyl tin catalyst is from 0.001 to 0.3 parts by mass per 100 parts by mass of the urethane prepolymer.

6. The adhesive composition according to any one of 1 to 5 above, where the aliphatic isocyanate A is at least one type of hexamethylene diisocyanate-modified product selected from the group consisting of reaction products of hexamethylene diisocyanate and a polyol having tri- or higher functionality, allophanates of hexamethylene diisocyanate, isocyanurates of hexamethylene diisocyanate, and biurets of hexamethylene diisocyanate.

7. The adhesive composition according to any one of 1 to 6 above, where the aminosilane compound B contains an imino group, and the imino group bonds to at least one aromatic hydrocarbon group.

8. The adhesive composition according to any one of 1 to 7 above, further containing a tertiary amine.

9. The adhesive composition according to any one of 1 to 8 above, where the preliminary composition further contains a filler.

10. The adhesive composition according to any one of 1 to 9 above, where the preliminary composition further contains a plasticizer.

11. A method of producing an adhesive composition, the method including:
a mixing step 1 of mixing a urethane prepolymer, an aliphatic isocyanate A, and an aminosilane compound B to obtain a preliminary composition; and
a mixing step 2 of mixing the preliminary composition and a dimethyl tin catalyst represented by Formula (1) to produce the adhesive composition described in any one of 1 to 7 (or 10) above.

12. The method of producing the adhesive composition according to 11 above, where, in the mixing step 1, at least one type selected from the group consisting of fillers and plasticizers is further used.

13. The method of producing the adhesive composition according to 11 or 12 above, where, in the mixing step 2, a tertiary amine is further used.

The adhesive composition of the present technology has excellent adhesion to a poorly adhesive coated plate.

According to the production method of the present technology, the adhesive composition having excellent adhesion to a poorly adhesive coated plate can be produced.

DETAILED DESCRIPTION

Embodiments of the present technology are described in detail below.

Note that, in the present specification, numerical ranges indicated using "(from) . . . to . . . " include the former number as the lower limit value and the later number as the upper limit value.

Furthermore, in the present specification, when a component contains two or more types of substances, the content of the component indicates the total content of the two or more types of substances.

In the present specification, exhibition of "superior adhesion to a poorly adhesive coated plate" is referred to as exhibition of "superior effect of the present technology" or "superior adhesion".

The adhesive composition of the present technology is a one-part moisture-curable adhesive composition containing:
a preliminary composition obtained by mixing a urethane prepolymer, an aliphatic isocyanate A, and an aminosilane compound B; and
a dimethyl tin catalyst represented by Formula (1) below.

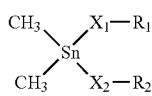
(1)

where, $X_1$ and $X_2$ each independently represent a divalent heteroatom, and $R_1$ and $R_2$ each independently represent a hydrocarbon group that may have a heteroatom.

The adhesive composition of the present technology is thought to achieve desired effects as a result of having such a configuration. Although the reason for this is unknown, the reason is presumed to be as follows.

The predetermined dimethyl tin catalyst has a higher activity than that of dioctyl tin catalyst, and the inventor of the present technology presumes that, because the adhesive composition of the present technology contains the predetermined dimethyl tin catalyst, the adhesive composition tends to form a bond with an active hydrogen other than water (e.g. coated plate) compared to the tendency to cure the adhesive agent itself due to reactions with water. It is conceived that the adhesive composition of the present technology exhibits excellent adhesion to poorly adhesive coated plates as a result of this.

Adhesive Composition

Each of the components contained in the adhesive composition of the present technology is described in detail below.

Urethane Prepolymer

The urethane prepolymer used in the adhesive composition of the present technology is not particularly limited as long as the urethane prepolymer is a urethane prepolymer having isocyanate groups at its terminals. For example, a urethane prepolymer, obtained by reacting a polyisocyanate and a compound having two or more active hydrogen-containing groups in each molecule (active hydrogen compound) under a condition that the amount of the isocyanate groups contained in the polyisocyanate is in excess relative to the amount of active hydrogen-containing groups contained in the active hydrogen compound, can be used. The urethane prepolymer may contain from 0.5 to 5 mass % of isocyanate groups at its molecular terminals.

The polyisocyanate used in production of the urethane prepolymer is not particularly limited as long as the polyisocyanate is a polyisocyanate having two or more isocyanate groups in each molecule.

Examples of the polyisocyanate include aromatic polyisocyanates, such as tolylene diisocyanate (TDI), diphenylmethane diisocyanate (MDI; e.g. 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic and/or alicyclic polyisocyanates, such as hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatemethyl)cyclohexane ($H_6$XDI), and dicyclohexylmethane diisocyanate ($H_{12}$MDI); carbodiimide-modified polyisocyanates thereof; and isocyanurate-modified polyisocyanates thereof.

A single polyisocyanate can be used or a combination of two or more polyisocyanates can be used.

Among these, from the perspective of excellent curability and excellent physical properties of the cured product, an aromatic polyisocyanate is preferable, and MDI is more preferable.

The compound having two or more active hydrogen-containing groups in each molecule (active hydrogen compound) used during the production of the urethane prepolymer is not particularly limited. Examples of the active hydrogen-containing group include a hydroxy (OH) group, an amino group, and an imino group.

Preferable examples of the active hydrogen compound include polyol compounds having two or more hydroxy (OH) groups in each molecule and the like. Among these, a polyol compound is preferable.

The polyol compound is not particularly limited as long as the polyol compound is a compound having two or more hydroxy groups. Examples thereof include polyether polyols; polyester polyols; polymer polyols having a carbon-carbon bond in the main backbone chain, such as acrylic polyol, polybutadiene diol, and hydrogenated polybutadiene polyols; low-molecular-weight polyhydric alcohols; and polyol mixtures of these. Among these, a polyether polyol is exemplified as an example of preferable aspects.

Examples of the polyether polyol include a polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), polytetraethylene glycol, sorbitol polyol, and the like.

The polyether polyol is preferably polypropylene glycol or polyoxypropylene triol from the perspective of excellent miscibility with polyisocyanate.

The weight average molecular weight of the polyether polyol is preferably from 500 to 20000 because the viscosity of the urethane prepolymer, which is obtained by a reaction with isocyanate, exhibits an appropriate fluidity at room temperature. In the present technology, the weight average molecular weight is a value obtained by gel permeation chromatography (GPC) (solvent: tetrahydrofuran (THF) is used) based on calibration with polystyrene.

One type of the active hydrogen compound can be used alone, or a combination of two or more types of the active hydrogen compounds can be used.

From the perspective of superior adhesion and excellent curability, the urethane prepolymer is preferably a urethane prepolymer obtained by reacting a polyether polyol and an aromatic polyisocyanate, and more preferably a urethane prepolymer obtained by reacting polypropylene polyol and diphenylmethane diisocyanate.

One type of the urethane prepolymer can be used alone, or a combination of two or more types of the urethane prepolymers can be used.

The method of producing the urethane prepolymer is not particularly limited. For example, the urethane prepolymer can be produced, using a polyisocyanate under a condition that from 1.5 to 2.5 mol of isocyanate groups are reacted per 1 mol of active hydrogen-containing groups (e.g. hydroxy groups) contained in the active hydrogen compound, by mixing and reacting these.

One type of the urethane prepolymer can be used alone, or a combination of two or more types of the urethane prepolymers can be used.

Aliphatic Isocyanate A

The aliphatic isocyanate A used in the adhesive composition of the present technology is not particularly limited as long as the aliphatic isocyanate A is an aliphatic hydrocarbon compound having at least one isocyanate group in each molecule.

The aliphatic hydrocarbon group contained in the aliphatic isocyanate A is not particularly limited. The aliphatic hydrocarbon group may be a straight-chain, branched-chain, or cyclic aliphatic hydrocarbon group, and a straight-chain aliphatic hydrocarbon group is preferable. The aliphatic hydrocarbon group may be a saturated or unsaturated aliphatic hydrocarbon group, and a saturated aliphatic hydrocarbon group is preferable.

The number of the isocyanate group contained in each molecule of the aliphatic isocyanate A is preferably 2 or more, and more preferably 2 or 3, from the perspective of even better adhesion.

Examples of the aliphatic isocyanate A include aliphatic polyisocyanates (excluding modified products), such as hexamethylene diisocyanate (HDI), trimethyl hexamethylene diisocyanate (TMHDI), lysine diisocyanate, norbornane diisocyanate (NBDI), trans-cyclohexane-1,4-diisocyanate, isophorone diisocyanate (IPDI), bis(isocyanatemethyl)cyclohexane ($H_6$XDI), and dicyclohexylmethane diisocyanate ($H_{12}$MDI) (hereinafter, the aliphatic polyisocyanate described above may be referred to as "aliphatic polyisocyanate b"); and modified products of aliphatic polyisocyanates.

The aliphatic isocyanate A is preferably a modified product of aliphatic polyisocyanate from the perspective of superior adhesion and a wider range of adhesion depending on the environment at the time of curing (i.e. excellent adhesion regardless of difference in the environment during the curing (e.g. temperature environment)).

The modified product of the aliphatic polyisocyanate is preferably at least one type of aliphatic isocyanate-modified product a selected from the group consisting of reaction products of a polyol having tri- or higher functionality and an aliphatic polyisocyanate, allophanates of aliphatic polyisocyanate, isocyanurates of aliphatic polyisocyanate, and biurets of aliphatic polyisocyanate, from the perspective of excellent balance between adhesion and physical properties of the adhesive agent after the curing.

The aliphatic polyisocyanate used in the aliphatic isocyanate-modified product a is not particularly limited as long as the aliphatic polyisocyanate is an aliphatic hydrocarbon compound having at least two isocyanate groups in each molecule. Examples include the same as those exemplified for the aliphatic polyisocyanate b. Among these, a straight-chain aliphatic polyisocyanate is preferable, and HDI is more preferable, from the perspective of achieving even better adhesion and being less likely to cause foaming due to the added amount.

Examples of the reaction product of a polyol having tri- or higher functionality and an aliphatic polyisocyanate include reaction products of trifunctional polyol such as trimethylolpropane (TMP), and glycerin, and an aliphatic polyisocyanate b (e.g. HDI). Specific examples include reaction products of TMP and HDI (e.g. compound represented by Formula (5) below) and reaction products of glycerin and HDI (e.g. compound represented by Formula (6) below).

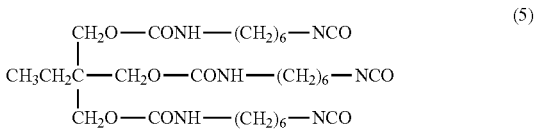

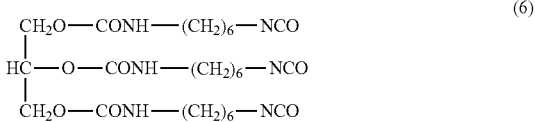

Examples of the allophanate of aliphatic polyisocyanate include an allophanate of HDI.

Examples of the biuret of aliphatic polyisocyanate include a biuret of HDI. Specifically, preferred examples include a compound represented by Formula (7) below.

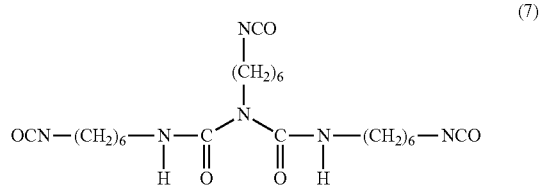

Examples of the isocyanurate of aliphatic polyisocyanate include an isocyanurate of HDI. Specific examples include a compound represented by Formula (8) below.

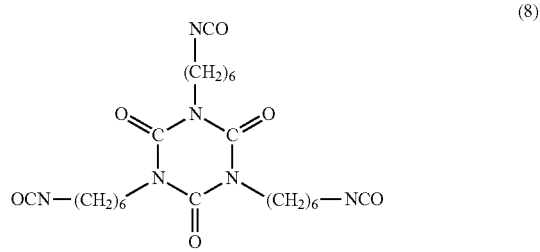

From the perspective of achieving excellent heat-resistant adhesion and stability in pipes, the aliphatic isocyanate A is preferably a biuret of HDI or an isocyanurate of HDI, and more preferably a biuret of HDI.

The production of the aliphatic isocyanate A is not particularly limited. Examples thereof include conventionally known production methods. The aliphatic isocyanate A may be used alone, or a combination of two or more types of the aliphatic isocyanates A may be used.

The amount of the aliphatic isocyanate A is preferably from 0.8 to 15 parts by mass, more preferably from 0.8 to 10 parts by mass, and even more preferably from 3.0 to 8.0 parts by mass, per 100 parts by weight of the urethane prepolymer from the perspective of superior adhesion and excellent physical properties of the cured product.

Aminosilane Compound B

The aminosilane compound B used in the adhesive composition of the present technology is not particularly limited as long as the aminosilane compound B is a compound having at least one type selected from the group consisting of an amino group (—$NH_2$) and an imino group (—NH—), and a hydrolyzable silyl group. The amino group or the imino group and the hydrolyzable silyl group can be bonded through an organic group.

When the aminosilane compound B contains an imino group, an example of a preferable aspect is one in which the group bonded to the imino group is an aromatic hydrocarbon group.

The aromatic hydrocarbon group is not particularly limited as long as the aromatic hydrocarbon group is a hydrocarbon group having at least an aromatic ring. Examples of the aromatic ring include a benzene ring and a naphthalene ring.

The aromatic ring may have a substituent. Examples of the substituent include alkyl groups.

Examples of the hydrolyzable silyl group include substances in which at least one hydrolyzable group is bonded to one silicon atom. When one or two hydrolyzable groups are bonded to one silicon atom, other groups that can bond to the same silicon atom are not particularly limited. Examples thereof include hydrocarbon groups. The hydrocarbon group is not particularly limited but is preferably an alkyl group.

Examples of the hydrolyzable silyl group include alkoxysilyl groups. Specific examples thereof include methoxysilyl groups (monomethoxysilyl group, dimethoxysilyl group, and trimethoxysilyl group) and ethoxysilyl groups (monoethoxysilyl group, diethoxysilyl group, and triethoxysilyl group).

The organic group is not particularly limited. Examples thereof include hydrocarbon groups that may have a hetero atom such as an oxygen atom, nitrogen atom, and sulfur atom. Examples of the hydrocarbon group include aliphatic hydrocarbon groups (which may be in a form of straight-chain, branched-chain, or ring, and may have an unsaturated bond), aromatic hydrocarbon groups, and combinations thereof. At least one of the carbon atom or the hydrogen atom contained in the hydrocarbon group may be substituted with a substituent. Among these, an example of a preferable aspect is one in which the organic group is an aliphatic hydrocarbon group.

From the perspective of superior adhesion, excellent storage stability of the adhesive agent, and excellent flow resistance, the aminosilane compound B is preferably a compound having an alkoxysilyl group and an imino group in each molecule, and is more preferably a compound having an alkoxysilyl group and an imino group bonded to an aromatic hydrocarbon group in each molecule, and even more preferably a compound having an alkoxysilyl group and an imino group bonded to an aromatic hydrocarbon group in each molecule, the alkoxysilyl group and the imino group being bonded through an aliphatic hydrocarbon group.

Examples of the aminosilane compound B include a compound represented by Formula (I) below.

$$R^1{}_n\text{—}NH_{2-n}\text{—}R^2\text{—}Si\text{—}R^3{}_3 \qquad (I)$$

In Formula (I), $R^1$ represents an aromatic hydrocarbon group, n is 0 or 1, $R^2$ represents a divalent aliphatic hydrocarbon group, at least one of the three $R^3$ moieties is an alkoxy group and the three $R^3$ moieties may be the same or different. When one or two of the three $R^3$ moieties are alkoxy group(s), the other $R^3$ is preferably alkyl group(s).

Examples of the aromatic hydrocarbon group include a phenyl group.

Examples of the divalent aliphatic hydrocarbon group include a methylene group, an ethylene group, a propylene group, and a trimethylene group.

Examples of the alkoxy group include a methoxy group and an ethoxy group.

Examples of the alkyl group include a methyl group and an ethyl group.

Specific examples of the aminosilane compound B include N-phenyl-3-aminopropyltrimethoxysilane and N-phenyl-3-aminopropyltriethoxysilane.

The production of the aminosilane compound B is not particularly limited. Examples thereof include conventionally known production methods. The aminosilane compound B may be used alone, or a combination of two or more types of the aminosilane compounds B may be used.

The amount of the aminosilane compound B is preferably from 0.1 to 10 parts by mass, more preferably from 0.3 to 5 parts by mass, and even more preferably from 0.8 to 3 parts by mass, per 100 parts by weight of the urethane prepolymer from the perspective of superior adhesion and excellent storage stability of the uncured product.

Filler

In the present technology, the preliminary composition may further contain a filler. In this case, excellent thixotropy of adhesive agent, excellent deep curability after the adhesive agent has been coated, and excellent physical properties after the curing are achieved.

The filler is not particularly limited. An example of a preferable aspect is one in which the filler is at least one type selected from the group consisting of carbon blacks and white fillers. The filler may be a surface-treated filler which has been treated with a surface treating agent, such as fatty acids, resin acids, urethane compounds, and fatty acid esters.

The carbon black is not particularly limited. Examples thereof include conventionally known carbon blacks.

From the perspective of excellent flow resistance and excellent physical properties of the cured product, the amount of the carbon black is preferably from 10 to 150 parts by mass, and more preferably from 30 to 100 parts by mass, per 100 parts by mass of the urethane prepolymer.

Examples of the white filler include calcium carbonates, such as heavy calcium carbonate, precipitated calcium carbonate (light calcium carbonate), and colloidal calcium carbonate; magnesium carbonate, zinc carbonate; silica, such as fumed silica, calcined silica, precipitated silica, pulverized silica, and molten silica; diatomaceous earth; iron oxide, zinc oxide, titanium oxide, barium oxide, magnesium oxide; pyrophyllite clay, kaolin clay, and calcined clay.

From the perspective of excellent deep curability during curing, the amount of the white filler is preferably from 5 to 80 parts by mass, and more preferably from 10 to 50 parts by mass, per 100 parts by mass of the urethane prepolymer.

Plasticizer

In the present technology, the preliminary composition may further contain a plasticizer. In this case, excellent control of viscosity and physical properties of the adhesive composition and excellent coatability are achieved.

Examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, butylene glycol adipate polyester, and the like.

One type of the plasticizer can be used alone, or a combination of two or more types of the plasticizers can be used.

From the perspective of excellent control of viscosity and physical properties and excellent coatability, the amount of the plasticizer is preferably from 5 to 100 parts by mass, and more preferably from 10 to 50 parts by mass, per 100 parts by mass of the urethane prepolymer.

In the present technology, the preliminary composition is produced by mixing the urethane prepolymer, the aliphatic isocyanate A, and the aminosilane compound B. That is, in the present technology, the preliminary composition contains the urethane prepolymer, the aliphatic isocyanate A, and the aminosilane compound B. Furthermore, the preliminary composition may further contain at least one type selected from the group consisting of fillers and plasticizers.

In the preliminary composition, the urethane prepolymer and the aminosilane compound B may be reacted. Furthermore, the aliphatic isocyanate A and the aminosilane compound B may be reacted.

Therefore, after being mixed, the preliminary composition may further contain a reaction product obtained by reacting the aminosilane compound B and the aliphatic isocyanate A and/or a reaction product obtained by reacting the aminosilane compound B and the urethane prepolymer.

Dimethyl Tin Catalyst

The dimethyl tin catalyst contained in the adhesive composition of the present technology is a compound represented by Formula (1) below.

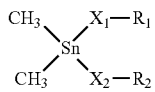
(1)

In Formula (1), $X_1$ and $X_2$ each independently represent a divalent heteroatom, and $R_1$ and $R_2$ each independently represent a hydrocarbon group that may have a heteroatom.

Examples of the divalent heteroatom include an oxygen atom and a sulfur atom.

Examples of the heteroatom that may be contained in the hydrocarbon group include an oxygen atom, a nitrogen atom, and a sulfur atom.

Examples of the hydrocarbon group include aliphatic hydrocarbon groups (which may be in a form of straight-chain, branched-chain, or ring, and may have an unsaturated bond), aromatic hydrocarbon groups, and combinations thereof.

At least one of the carbon atom or the hydrogen atom contained in the hydrocarbon group may be substituted with a substituent. Examples of the substituent include a carbonyl group and an ester bond. Among the carbon atoms contained in the hydrocarbon group, a carbon atom located at a position other than the both terminals of the hydrocarbon group may be substituted with a substituent.

Dimethyltin Dicarboxylate

From the perspectives of achieving excellent catalytic activity and suppressing increase in the viscosity of the composition after storage, the dimethyl tin catalyst is preferably dimethyltin dicarboxylate in which, in Formula (1), $X_1$ and $X_2$ are oxygen atoms and $R_1$ and $R_2$ are carbonyl group-containing alkyl groups, and the oxygen atom and the carbonyl group are bonded to form an ester bond.

Examples of the dimethyltin dicarboxylate include dimethyltin dicarboxylate represented by Formula (2) below.

(2)

In Formula (2), $R_3$ and $R_4$ each independently represent a hydrocarbon group. The hydrocarbon groups are the same as the hydrocarbon groups represented by $R_1$ and $R_2$.

Specific examples of the dimethyltin dicarboxylate include dimethyltin dilaurate represented by Formula (2-1) below; and dimethyltin dioctate represented by Formula (2-2) below.

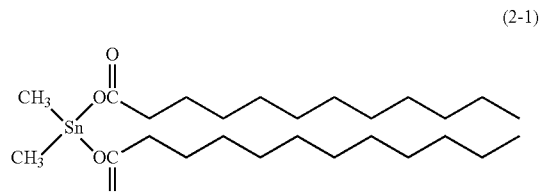
(2-1)

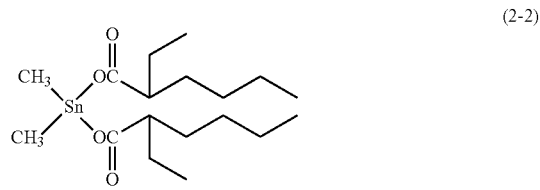
(2-2)

Thio-Based Dimethyl Tin Catalyst

From the perspectives of achieving superior adhesion, excellent balance between the stability (of the catalyst itself) and the catalytic activity, excellent stability in pipes, and suppressing increase in the viscosity of the composition after the storage, the dimethyl tin catalyst is preferably a thio-based dimethyl tin catalyst in which, in Formula (1), $X_1$ and $X_2$ are sulfur atoms and $R_1$ and $R_2$ are unsubstituted or ester bond-containing alkyl groups. In this case, $R_1$ and $R_2$ may be the same or different.

Note that "$R_1$ and $R_2$ are unsubstituted or ester bond-containing alkyl groups" indicates that $R_1$ and $R_2$ are unsubstituted alkyl groups, or $R_1$ and $R_2$ are ester bond-containing alkyl groups.

Furthermore, in the ester bond-containing alkyl group, at least one carbon atom contained in the alkyl group may be substituted with a substituent. Examples of the substituent include a carbonyl group and an ester bond. Among the carbon atoms contained in the alkyl group, a carbon atom located at a position other than the both terminals of the alkyl group may be substituted with a substituent.

Dimethyltin Dimercaptide

Examples of the thio-based dimethyl tin catalyst in which, in Formula (1), $X_1$ and $X_2$ are sulfur atoms and $R_1$ and $R_2$ are unsubstituted alkyl groups include dimethyltin dimercaptide.

Examples of the dimethyltin dimercaptide include dimethyltin dimercaptide represented by Formula (3) below.

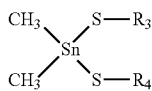

(3)

In Formula (3), $R_3$ and $R_4$ each independently represent a hydrocarbon group. The hydrocarbon groups are the same as the hydrocarbon groups represented by $R_1$ and $R_2$.

Specific examples of the dimethyltin dimercaptide include dimethyltin didodecacyl mercaptide represented by Formula (3-1) below and dimethyltin dioctyl mercaptide.

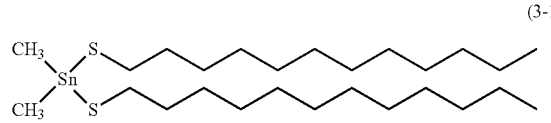

(3-1)

Dimethyltin Dithioglycolate

Examples of the dimethyl tin catalyst in which, in Formula (1), $X_1$ and $X_2$ are sulfur atoms and $R_1$ and $R_2$ are ester bond-containing alkyl groups include dimethyltin dithioglycolate.

Examples of the dimethyltin dithioglycolate include dimethyltin dithioglycolate represented by Formula (4) below.

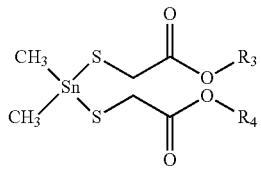

(4)

In Formula (4), $R_3$ and $R_4$ each independently represent a hydrocarbon group. The hydrocarbon groups are the same as the hydrocarbon groups represented by $R_1$ and $R_2$.

Specific examples of the dimethyltin dithioglycolate include dimethyltin bis(2-ethylhexylthioglycolate) represented by Formula (4-1) below.

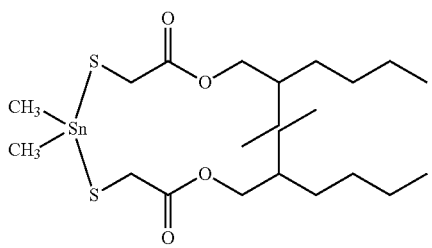

(4-1)

Production of the dimethyl tin catalyst is not particularly limited. Examples thereof include conventionally known production methods. One type of the dimethyl tin catalyst can be used alone, or a combination of two or more types of the dimethyl tin catalysts can be used.

The content of the dimethyl tin catalyst is preferably from 0.0005 to 1.0 part by mass, more preferably from 0.005 to 0.5 parts by mass, and even more preferably from 0.01 to 0.3 parts by mass, per 100 parts by mass of the urethane prepolymer from the perspective of superior adhesion, excellent curability, excellent storage stability of the uncured product, and excellent stability in pipes.

Tertiary Amine

The adhesive composition of the present technology may further contain a tertiary amine.

Examples of the tertiary amine include open-chain amines, such as trimethylamine, triethylamine, tripropylamine, tributylamine, triamylamine, trihexylamine, trioctylamine, trilaurylamine, dimethyl ethyl amine, dimethylpropylamine, dimethylbutylamine, dimethyl amyl amine, dimethylhexylamine, dimethylcyclohexylamine, dimethyloctylamine, dimethyllaurylamine, triallylamine, tetramethylethylenediamine, tetramethylbutanediamine, and triethanolamine; amines in which the nitrogen atom constituting a tertiary amine forms a part of a ring structure, such as triethylenediamine, N-methylmorpholine, 4,4'-(oxydi-2,1-ethanediyl)bis-morpholine, N,N-dimethylaminoethylmorpholine, pyridine, picoline, 1,8-diazabicyclo[5.4.0]undecene, 1, 1,4-diazabicyclo[2.2.2]octane, N,N'-dimethylpiperazine, dimorpholinodiethyl ether, and bis(2,2-morpholinoethyl)ether; ether bond-containing amines, such as bis(dimethylaminoethyl) ether; compounds having a ring structure and a tertiary amine, such as N,N-dimethylbenzylamine, dimethylaminomethylphenol, and tris(dimethylaminomethyl)phenol; and the like.

One type of the tertiary amine can be used alone, or a combination of two or more types of the tertiary amines can be used.

Among these, from the perspective of achieving excellent film formability during coating and excellent balance between storage stability and curing rate, N,N-dimethylaminoethylmorpholine and dimorpholinodiethyl ether are preferable.

An example of a preferable aspect is one in which the tertiary amine contains no aminosilane compound.

From the perspective of superior adhesion, excellent storage stability of the adhesive agent, and excellent curability, the content of the tertiary amine is preferably from 0.01 to 2.0 parts by mass per 100 parts by mass of the urethane prepolymer.

Other Components

The adhesive composition of the present technology may further contain, as necessary, additives, such as isocyanate compounds except the aliphatic isocyanate A, silane coupling agents except the aminosilane compound B, catalysts except the dimethyl tin catalyst and the tertiary amines, adhesion promoters, anti-sagging agents, anti-aging agents, antioxidants, pigments (dyes), thixotropic agents, ultraviolet absorbers, flame retardants, surfactants (including leveling agents), dispersants, dehydrating agents, and antistatic agents, in a range that does not inhibit the object of the present technology. The amount of the additive can be adjusted as desired.

Examples of the method of producing the adhesive composition of the present technology include a method of producing an adhesive composition of the present technology described below.

The adhesive composition of the present technology is one-part type.

The adhesive composition of the present technology is moisture-curable. For example, the composition can be cured by moisture in the atmosphere under conditions of −20 to +50° C.

The adhesive composition of the present technology exhibits excellent adhesion to poorly adhesive coated plates even at low temperatures of the environmental temperatures of −20° C. to +5° C.

The adherend to which the adhesive composition of the present technology can be applied is not particularly limited. Examples thereof include metal (including coated plates), plastic, rubber, and glass.

The adhesive composition of the present technology can be applied to the adherend without using a primer on the adherend.

The adhesive composition of the present technology can be used on a poorly adhesive coated plate. The coating material that is coated on the poorly adhesive coated plate is not particularly limited. Examples thereof include acryl/silane-based coating materials. Note that, in the present specification, "A/B-based coating material" means an A-based coating material and a B-based coating material. When the coating material applied on the poorly adhesive coated plate is, for example, an acryl/silane-based coating material, the coating material that has been applied on the poorly adhesive coated plate is the acryl-based coating material and the silane-based coating material.

Furthermore, the adhesive composition of the present technology has excellent adhesion to coated plates other than the poorly adhesive coated plates. The coated plates other than the poorly adhesive coated plates are not particularly limited. Examples thereof include conventionally known coated plates. Examples of coating used in the coated plates other than the poorly adhesive coated plates include urethane coating materials, acid/epoxy-based coating materials, and acryl/melamine-based coating materials.

Method of Producing Adhesive Composition

The method of producing the adhesive composition of the present technology is described below.

The method of producing the adhesive composition of the present technology (the production method of the present technology) is a method of producing an adhesive composition, the method including:

a mixing step 1 of mixing a urethane prepolymer, an aliphatic isocyanate A, and an aminosilane compound B to obtain a preliminary composition; and a mixing step 2 of mixing the preliminary composition and a dimethyl tin catalyst represented by Formula (1) above to produce the adhesive composition of the present technology.

First, in the mixing step 1, the preliminary composition is obtained by mixing the urethane prepolymer, the aliphatic isocyanate A, and the aminosilane compound B.

The urethane prepolymer, the aliphatic isocyanate A, and the aminosilane compound B used in the mixing step 1 are the same as those described above.

In the mixing step 1, at least one type selected from the group consisting of fillers and plasticizers may be further used.

When the at least one type selected from the group consisting of fillers and plasticizers are further used in the mixing step 1, the preliminary composition may be produced by, first, mixing the urethane prepolymer, the aliphatic isocyanate A, and the aminosilane compound B, and then adding the at least one type selected from the group consisting of fillers and plasticizers.

Furthermore, the preliminary composition may be produced by simultaneously mixing the urethane prepolymer, the aliphatic isocyanate A, the aminosilane compound B, and the at least one type selected from the group consisting of fillers and plasticizers.

Furthermore, for example, the preliminary composition may be produced by mixing the urethane prepolymer, the plasticizer, and the aliphatic isocyanate A, adding and mixing the aminosilane B to the mixture, and then adding and mixing the filler to the mixture.

In the mixing step 1, for example, a vertical mixer or a horizontal mixer may be used.

The mixing temperature in the mixing step 1 is preferably from 40 to 90° C.

The mixing step 1 is preferably performed under reduced pressure.

Then, in the mixing step 2, the adhesive composition of the present technology is produced by mixing the preliminary composition and the dimethyl tin catalyst.

The dimethyl tin catalyst used in the mixing step 2 is the same as the dimethyl tin catalyst represented by Formula (1) above.

In the mixing step 2, for example, a vertical mixer or a horizontal mixer may be used.

The mixing temperature in the mixing step 2 is preferably from 40 to 70° C.

The mixing step 2 is preferably performed under reduced pressure.

When the adhesive composition of the present technology further contains additive(s), the additive(s) may be added appropriately in the mixing step 1 and/or 2.

When the adhesive composition of the present technology further contains a tertiary amine, an example of a preferable aspect is one in which the tertiary amine is used in the mixing step 2.

EXAMPLES

The present technology is described below in detail using examples but the present technology is not limited to such examples.

Production of Composition

In the mixing step 1, the components shown in "mixing step 1" of Table 1 below were used in the composition (part by mass) shown in the same table and mixed using a horizontal mixer in a condition at 40 to 70° C. and 2 kPa or less for 1 hour to produce a preliminary composition. The preliminary composition produced as described above was used as is in the mixing step 2.

Note that, in the mixing step 1, the isocyanate compound, the silane compound, and the components other than the urethane prepolymer shown in Table 2 were added and mixed simultaneously with the urethane prepolymer shown in Table 2.

Then, in the mixing step 2, the components shown in "mixing step 2" of Table 1 below were used in the composition (part by mass) shown in the same table and mixed to the preliminary composition using a horizontal mixer in a condition at 40 to 70° C. and 2 kPa or less to produce a composition.

Evaluation

The following evaluations were performed using the compositions produced as described above. The results are shown in Table 1.

Flow Resistance

Each of the compositions produced as described above was extruded in a strip of right triangular beads with a base of 6 mm and a height of 10 mm onto a glass plate. The glass plate was held vertical (at an angle of 90°) so that the hypotenuse of the composition extruded in a shape of right triangle faced to the bottom and the side having the height of 10 mm of the composition was horizontal, and was fixed. The glass plate was maintained in the vertical position and left in a condition at 20° C. and 65% relative humidity for 30 minutes.

The distance h (mm) of the sag of the vertex of the right triangle of the composition after the glass plate was left to stand in the vertical position for 30 minutes was measured, and the flow resistance was evaluated based on this value. The value is shown in the row of "Flow resistance" in Table 1. A smaller value indicates superior flow resistance.

Viscosity Increase Percentage

Initial Viscosity

Note that the SOD viscosity (initial viscosity) of the composition produced as described above was measured using a pressure viscometer (ASTM D 1092) in accordance with JASO (Japanese Automotive Standards Organization) M338-89.

Viscosity after Storage

The composition produced as described above was placed in a container, and the air was purged with a nitrogen gas. The container was sealed, and the composition was stored for 7 days at 40° C. Thereafter, SOD viscosity (Pa·s) of the composition was measured. The measurement method of the viscosity after the storage was the same as the method described above.

Calculation of Viscosity Increase Percentage and Evaluation Criteria

From the initial viscosity and the viscosity after the storage, the viscosity increase percentage (the ratio of increased viscosity to initial viscosity) was calculated.

The case where the viscosity increase percentage was 30% or less was evaluated as achieving excellent viscosity stability (storage stability).

Heat-Resistant Adhesion

Production of Sample for Heat-Resistant Adhesion Evaluation

One sheet of glass (25 mm length×100 mm width×8 mm thickness; primer-treated; the primer was MS-90 (trade name), manufactured by Yokohama Rubber Co., Ltd.) was prepared as an adherend.

The composition produced as described above was applied on the glass at room temperature.

After the application, compression bonding was performed until the thickness of the composition on the glass became 5 mm, and the composition was cured in a condition at 23° C. and a relative humidity of 50% for 72 hours and then left in an environment at 120° C. for 7 days. This was used as a sample for heat-resistant adhesion evaluation.

Hand Peel Test

Hand peel test was performed using the sample for heat-resistant adhesion evaluation obtained as described above by a utility knife.

As a result of the hand peel test, the case where the composition after the curing resulted in cohesive failure was indicated as "CF". In this case, significantly excellent heat-resistant adhesion was exhibited.

Furthermore, the case where the composition after the curing resulted in interfacial failure in the interface between the composition and the primer was indicated as "PS". In this case, heat-resistant adhesion was low.

Stability in Pipes

The composition produced as described above was filled in a hose (diameter: 5 mm; length: 20 cm; trade name: CHUKOH FLO tube, manufactured by Chukoh Chemical Industries, Ltd.; formed from polytetrafluoroethylene (PTFE)) with care so that air is not filled therein. After the filling, the hose was closely sealed and the sealed hose was left in a condition at 50° C. for 1 week.

After 1 week, the hose was returned to room temperature, the center of the hose was cut into a round slice and the inside of the hose was observed by removing the uncured composition from the hose.

The case where no composition was left in the hose was evaluated as achieving excellent stability in pipes and indicated as "Excellent".

In the case where the composition was cured from the inner surface to the center of the hose, the thickness of the cured composition was measured from an arbitrary point on the inner surface of the hose in a direction toward the center of the cross section of the hose in the cross section of the hose. A greater thickness indicates lower stability in pipes.

Adhesion 1

Production of Sample for Evaluating Adhesion 1

A poorly adhesive coated plate obtained by applying an acryl/silane-based coating material on a steel plate was prepared.

Each of the compositions produced as described above was directly applied on the poorly adhesive coated plate without the use of a primer, matured in a condition at 5° C. and a relative humidity of 50% for 7 days to cure the composition, thereby producing a sample. The thickness of the composition after the curing was 5 mm. The sample produced as described above was used as the sample for evaluating the adhesion 1.

Peel Test

One end of the composition after the curing of the sample produced as described above was held, and peel test was performed by subjecting a composition after the curing to 180° peeling from the poorly adhesive coated plate in a condition at 20° C. The failure state was then observed.

The case where the cohesive failure occurred in the cured product was evaluated as achieving excellent adhesion and indicated as "CF".

The case where the interfacial failure occurred in the cured product was evaluated as exhibiting low adhesion and indicated as "AF".

Adhesion 2

Production of Sample for Evaluating Adhesion 2

A poorly adhesive coated plate obtained by applying an acryl/silane-based coating material on a steel plate was prepared.

Furthermore, each of the compositions produced as described above was stored in a condition at 50° C. and a relative humidity of 95% for 14 days to prepare a composition after the storage.

The composition after the storage prepared as described above was directly applied on the poorly adhesive coated plate without the use of a primer, matured in a condition at 5° C. and a relative humidity of 50% for 7 days to cure the composition, thereby producing a sample. The thickness of the composition after the curing was 5 mm. The sample produced as described above was used as the sample for evaluating the adhesion 2.

The peel test was performed in the same manner as the peel test for adhesion 1 except for using the sample for evaluating the adhesion 2. The evaluation criteria were also the same as those of the evaluation of the adhesion 1.

TABLE 1

|  |  |  | Comparative Examples | | | |
|---|---|---|---|---|---|---|
|  |  |  | 1 | 2 | 3 | 4 |
| Mixing step 1 | | | | | | |
| Adhesive base material | | | 200 | 200 | 200 | 200 |
| Isocyanate compound | Aliphatic isocyanate A1 | D165N | | | | |
|  | Aliphatic isocyanate A2 | D170N | | | | |
|  | (Comparison) Aromatic isocyanate | DM1351 | | | | 6 |
| Silane compound | (Comparison) Mercaptosilane | KBM802 | | | | |
|  | Aminosilane compound B1 | KBM573 | | | | 2 |
| Reaction product of aliphatic isocyanate A2 and aminosilane compound B1 | | | 8 | 8 | 8 | |
| Mixing step 2 | | | | | | |
| Metal catalyst | (Comparison) Bismuth catalyst | U600 | 0.01 | | | |
|  | (Comparison) Dioctyl tin catalyst | U810 | | 0.01 | | |
|  | (Comparison) Dibutyl tin catalyst | U100 | | | 0.01 | |
|  | Dimethyl tin catalyst 1 (carboxylate) | UL-22 | | | | |
|  | Dimethyl tin catalyst 2 (mercaptide) | UL-28 | | | | |
|  | Dimethyl tin catalyst 3 (thioglycolate) | UL-54 | 0.01 | | | |
| Amine catalyst | Amine catalyst 1 | TEDA | | | | |
|  | Amine catalyst 2 | DMDEE | 0.3 | 0.3 | 0.3 | 0.3 |
| Flow resistance | | | 0 | 0 | 0 | 0 |
| Viscosity increase percentage (%) | | | 15 | 15 | 15 | 15 |
| Heat-resistant adhesion | | | CF | CF | CF | CF |
| Stability in pipes | | | Excellent | Excellent | Excellent | Excellent |
| Adhesion 1 | | | AF | AF | AF | AF |
| Adhesion 2 | | | AF | AF | AF | AF |

|  |  |  | Comparative Examples | | | |
|---|---|---|---|---|---|---|
|  |  |  | 5 | 6 | 7 | 8 |
| Mixing step 1 | | | | | | |
| Adhesive base material | | | 200 | 200 | 200 | 200 |
| Isocyanate compound | Aliphatic isocyanate A1 | D165N | | | | |
|  | Aliphatic isocyanate A2 | D170N | 6 | 6 | 6 | 6 |
|  | (Comparison) Aromatic isocyanate | DM1351 | | | | |
| Silane compound | (Comparison) Mercaptosilane | KBM802 | 2 | | | |
|  | Aminosilane compound B1 | KBM573 | | 2 | 2 | 2 |
| Reaction product of aliphatic isocyanate A2 and aminosilane compound B1 | | | | | | |
| Mixing step 2 | | | | | | |
| Metal catalyst | (Comparison) Bismuth catalyst | U600 | | 0.01 | | |
|  | (Comparison) Dioctyl tin catalyst | U810 | | | 0.01 | |
|  | (Comparison) Dibutyl tin catalyst | U100 | | | | 0.01 |
|  | Dimethyl tin catalyst 1 (carboxylate) | UL-22 | | | | |
|  | Dimethyl tin catalyst 2 (mercaptide) | UL-28 | | | | |

TABLE 1-continued

|  |  |  |  |  |  |  |
|---|---|---|---|---|---|---|
|  | Dimethyl tin catalyst 3 (thioglycolate) | UL-54 | 0.01 |  |  |  |
| Amine catalyst | Amine catalyst 1 | TEDA |  |  |  |  |
|  | Amine catalyst 2 | DMDEE | 0.3 | 0.3 | 0.3 | 0.3 |
| Flow resistance |  |  | 2 | 0 | 0 | 0 |
| Viscosity increase percentage (%) |  |  | 28 | 15 | 15 | 15 |
| Heat-resistant adhesion |  |  | CF | CF | CF | CF |
| Stability in pipes |  |  | Excellent | Excellent | Excellent | Excellent |
| Adhesion 1 |  |  | AF | AF | AF | AF |
| Adhesion 2 |  |  | AF | AF | AF | AF |

|  |  |  | Examples ||||| 
|---|---|---|---|---|---|---|---|
|  |  |  | 1 | 2 | 3 | 4 | 5 |
| Mixing step 1 |  |  |  |  |  |  |  |
| Adhesive base material |  |  | 200 | 200 | 200 | 200 | 200 |
| Isocyanate compound | Aliphatic isocyanate A1 | D165N | 6 | 6 | 6 | 6 | 6 |
|  | Aliphatic isocyanate A2 | D170N |  |  |  |  |  |
|  | (Comparison) Aromatic isocyanate | DM1351 |  |  |  |  |  |
| Silane compound | (Comparison) Mercaptosilane | KBM802 |  |  |  |  |  |
|  | Aminosilane compound B1 | KBM573 | 2 | 2 | 2 | 2 | 2 |
| Reaction product of aliphatic isocyanate A2 and aminosilane compound B1 |  |  |  |  |  |  |  |
| Mixing step 2 |  |  |  |  |  |  |  |
| Metal catalyst | (Comparison) Bismuth catalyst | U600 |  |  |  |  |  |
|  | (Comparison) Dioctyl tin catalyst | U810 |  |  |  |  |  |
|  | (Comparison) Dibutyl tin catalyst | U100 |  |  |  |  |  |
|  | Dimethyl tin catalyst 1 (carboxylate) | UL-22 | 0.001 | 0.01 | 0.3 |  |  |
|  | Dimethyl tin catalyst 2 (mercaptide) | UL-28 |  |  |  | 0.001 |  |
|  | Dimethyl tin catalyst 3 (thioglycolate) | UL-54 |  |  |  |  | 0.001 |
| Amine catalyst | Amine catalyst 1 | TEDA |  |  |  |  |  |
|  | Amine catalyst 2 | DMDEE | 0.3 | 0.3 | 0.3 | 0.3 | 0.3 |
| Flow resistance |  |  | 0 | 0 | 0 | 0 | 0 |
| Viscosity increase percentage (%) |  |  | 12 | 15 | 24 | 14 | 10 |
| Heat-resistant adhesion |  |  | CF | CF | CF | CF | CF |
| Stability in pipes |  |  | Excellent | Excellent | Excellent | Excellent | Excellent |
| Adhesion 1 |  |  | CF | CF | CF | CF | CF |
| Adhesion 2 |  |  | CF | CF | CF | CF | CF |

|  |  |  | Examples ||||
|---|---|---|---|---|---|---|
|  |  |  | 6 | 7 | 8 | 9 |
| Mixing step 1 |  |  |  |  |  |  |
| Adhesive base material |  |  | 200 | 200 | 200 | 200 |
| Isocyanate compound | Aliphatic isocyanate A1 | D165N | 6 | 6 | 6 | 6 |
|  | Aliphatic isocyanate A2 | D170N |  |  |  |  |
|  | (Comparison) Aromatic isocyanate | DM1351 |  |  |  |  |
| Silane compound | (Comparison) Mercaptosilane | KBM802 |  |  |  |  |
|  | Aminosilane compound B1 | KBM573 | 2 | 2 | 2 | 2 |
| Reaction product of aliphatic isocyanate A2 and aminosilane compound B1 |  |  |  |  |  |  |

TABLE 1-continued

|  |  |  |  |  |  |  |
|---|---|---|---|---|---|---|
| Mixing step 2 |  |  |  |  |  |  |
| Metal catalyst | (Comparison) Bismuth catalyst | U600 |  |  |  |  |
|  | (Comparison) Dioctyl tin catalyst | U810 |  |  |  |  |
|  | (Comparison) Dibutyl tin catalyst | U100 |  |  |  |  |
|  | Dimethyl tin catalyst 1 (carboxylate) | UL-22 |  |  |  |  |
|  | Dimethyl tin catalyst 2 (mercaptide) | UL-28 | 0.01 |  | 0.3 |  |
|  | Dimethyl tin catalyst 3 (thioglycolate) | UL-54 |  | 0.01 |  | 0.3 |
| Amine catalyst | Amine catalyst 1 | TEDA |  |  |  |  |
|  | Amine catalyst 2 | DMDEE | 0.3 | 0.3 | 0.3 | 0.3 |
| Flow resistance |  |  | 0 | 0 | 0 | 0 |
| Viscosity increase percentage (%) |  |  | 17 | 12 | 25 | 22 |
| Heat-resistant adhesion |  |  | CF | CF | CF | CF |
| Stability in pipes |  |  | Excellent | Excellent | Excellent | Excellent |
| Adhesion 1 |  |  | CF | CF | CF | CF |
| Adhesion 2 |  |  | CF | CF | CF | CF |

|  |  |  | Examples |  |  |  |  |
|---|---|---|---|---|---|---|---|
|  |  |  | 10 | 11 | 12 | 13 | 14 |
| Mixing step 1 |  |  |  |  |  |  |  |
| Adhesive base material |  |  | 200 | 200 | 200 | 200 | 200 |
| Isocyanate compound | Aliphatic isocyanate A1 | D165N |  |  |  |  |  |
|  | Aliphatic isocyanate A2 | D170N | 6 | 6 | 6 | 6 | 6 |
|  | (Comparison) Aromatic isocyanate | DM1351 |  |  |  |  |  |
| Silane compound | (Comparison) Mercaptosilane | KBM802 |  |  |  |  |  |
|  | Aminosilane compound B1 | KBM573 | 2 | 2 | 2 | 2 | 2 |
| Reaction product of aliphatic isocyanate A2 and aminosilane compound B1 |  |  |  |  |  |  |  |
| Mixing step 2 |  |  |  |  |  |  |  |
| Metal catalyst | (Comparison) bismuth catalyst | U600 |  |  |  |  |  |
|  | (Comparison) dioctyl tin catalyst | U810 |  |  |  |  |  |
|  | (Comparison) dibutyl tin catalyst | U100 |  |  |  |  |  |
|  | Dimethyl tin catalyst 1 (carboxylate) | UL-22 |  | 0.5 |  |  |  |
|  | Dimethyl tin catalyst 2 (mercaptide) | UL-28 | 0.01 |  | 0.5 |  |  |
|  | Dimethyl tin catalyst 3 (thioglycolate) | UL-54 |  |  |  | 0.5 | 0.01 |
| Amine catalyst | Amine catalyst 1 | TEDA |  |  |  |  | 0.3 |
|  | Amine catalyst 2 | DMDEE | 0.3 | 0.3 | 0.3 | 0.3 |  |
| Flow resistance |  |  | 0 | 0 | 0 | 0 | 3 |
| Viscosity increase percentage (%) |  |  | 15 | 32 | 35 | 28 | 15 |
| Heat-resistant adhesion |  |  | CF | PS | PS | PS | PS |
| Stability in pipes |  |  | Excellent | 2.5 mm | 1.8 mm | Excellent | 1.5 mm |
| Adhesion 1 |  |  | CF | CF | CF | CF | CF |
| Adhesion 2 |  |  | CF | CF | CF | CF | CF |

Details of the components listed in Table 1 are as follows.

Adhesive base material: substance described below

Aliphatic isocyanate A1: biuret of hexamethylene diisocyanate (HDI) represented by Formula (7) above (D165N, manufactured by Mitsui Chemicals, Inc.)

Aliphatic isocyanate A2: isocyanurate of HDI represented by Formula (8) above, Takenate D170N, manufactured by Mitsui Chemicals, Inc.

Aromatic isocyanate: isocyanurate of tolylene diisocyanate (TDI), Desmodur 1351, manufactured by Bayer Mercaptosilane: 3-mercaptopropyl methyldimethoxysilane, KBM-802, manufactured by Shin-Etsu Chemical Co., Ltd.

Aminosilane compound B1: N-phenyl-3-aminopropyltriethoxysilane, KBM-573, manufactured by Shin-Etsu Chemical Co., Ltd.

Reaction product of aliphatic isocyanate A2 and aminosilane compound B1: compound produced by mixing 6 parts by mass of the aliphatic isocyanate A2 and 2 parts by mass of the aminosilane compound B1 and reacting the obtained mixture in a condition at 50° C. for 10 hours. The obtained compound was used as is as a reaction product of the aliphatic isocyanate A2 and the aminosilane compound B1.

Bismuth catalyst: inorganic bismuth (NEOSTANN U-600, manufactured by Nitto Kasei Co., Ltd.)

Dioctyl tin catalyst: dioctyltin dilaurate (NEOSTANN U-810, manufactured by Nitto Kasei Co., Ltd.)

Dibutyl tin catalyst: dibutyltin dilaurate (NEOSTANN U-100, manufactured by Nitto Kasei Co., Ltd.)

Dimethyl tin catalyst 1: dimethyltin dilaurate (trade name: UL-22, manufactured by Momentive Performance Materials Inc.)

Dimethyl tin catalyst 2: dimethyltin didodecacyl mercaptide (trade name: UL-28, manufactured by Momentive Performance Materials Inc.)

Dimethyl tin catalyst 3: dimethyltin bis(2-ethylhexylthioglycolate) (trade name: UL-54, manufactured by Momentive Performance Materials Inc.)

Amine catalyst 1: triethylenediamine (DABCO, manufactured by Air Products and Chemicals, Inc.)

Amine catalyst 2: dimorpholinodiethyl ether (manufactured by San-Apro Ltd.)

For the adhesive base material shown in Table 1, the components shown in Table 2 below were used in the composition (part by mass) shown in the same table.

TABLE 2

| Urethane prepolymer | 100 |
| Carbon black | 50 |
| Calcium carbonate | 30 |
| Plasticizer | 20 |

Details of the components listed in Table 2 are as follows.

Urethane prepolymer 1: The urethane prepolymer 1 containing 1.45% of isocyanate groups was synthesized by mixing 500 g (weight average molecular weight 2000) of polyoxypropylene diol, 1150 g (weight average molecular weight 5000) of polyoxypropylene triol, and 264 g of 4,4'-diisocyanate phenylmethane (molecular weight 250) (at this time NCO/OH=1.8), stirring the mixture in a nitrogen gas stream at 80° C. for 24 hours to allow the mixture to react.

Carbon black: N220, manufactured by NSCC Carbon Co., Ltd.

Calcium carbonate: heavy calcium carbonate (Super S, manufactured by Maruo Calcium Co., Ltd.)

Plasticizer: diisononyl phthalate (DINP, manufactured by Jay Plus, Inc.)

As is clear from the results shown in Table 1, Comparative Examples 1 to 3, which contained the reaction product of the aliphatic isocyanate and the aminosilane compound and contained metal catalysts other than the dimethyl tin catalyst, exhibited low adhesion to the poorly adhesive coated plate.

Comparative Example 4, which contained no aliphatic isocyanate but instead contained aromatic isocyanate, exhibited low adhesion to the poorly adhesive coated plate.

Comparative Example 5, which contained no aminosilane compound but instead contained mercaptosilane, exhibited low adhesion to the poorly adhesive coated plate.

Comparative Examples 6 to 8, which contained metal catalysts other than the dimethyl tin catalyst, exhibited low adhesion to the poorly adhesive coated plate.

On the other hand, it was found that the adhesive composition of the present technology achieved the predetermined effects.

When Examples 7 and 14 are compared for the structures of the aliphatic isocyanates, it was found that Example 7 which contained the biuret of HDI exhibited superior flow resistance, viscosity stability, heat-resistant adhesion, and stability in pipes to those of Example 14 which contained the isocyanurate of HDI.

When the viscosity increase percentages of Examples 1, 4, and 5 are compared for the structures of the dimethyl tin catalysts, it was found that the lowest viscosity increase percentage is achieved in the case where the dimethyl tin catalyst has a thioglycolate structure. The same results were shown in the comparison of Examples 2, 6, and 7, comparison of Examples 3, 8, and 9, and comparison of Examples of 11 to 13.

Furthermore, when the stabilities in pipes of Examples 11 to 13 are compared for the structures of the dimethyl tin catalysts, superior stability in pipes was achieved in the order of dimethyltin dicarboxylate, dimethyltin dimercaptide, and dimethyltin dithioglycolate, and the best stability in pipes was achieved by dimethyltin dithioglycolate.

When Examples 10 and 12 are compared for the contents of the dimethyl tin catalysts, the case where the content of the dimethyl tin catalyst is less than 0.5 parts by mass per 100 parts by mass of the urethane prepolymer, it was found that excellent heat-resistant adhesion and stability in pipes are achieved.

When Examples 1 to 3 are compared for the contents of the dimethyl tin catalysts, it was found that lower viscosity increase percentage is achieved in the case where the content of the dimethyl tin catalyst is lower. The same results were shown in the comparison of Examples 4, 6, and 8, comparison of Examples 5, 7, and 9, and comparison of Examples of 10 and 12.

The invention claimed is:

1. A one-part moisture-curable adhesive composition comprising:
a preliminary composition obtained by mixing a urethane prepolymer, an aliphatic isocyanate A, and an aminosilane compound B; and
a dimethyl tin catalyst represented by Formula (1):

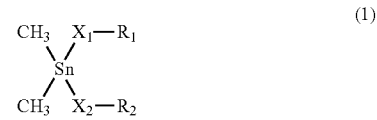

where, $X_1$ and $X_2$ each independently represent a divalent heteroatom, and $R_1$ and $R_2$ each independently represent a hydrocarbon group that may have a heteroatom.

2. The adhesive composition according to claim 1, wherein the divalent heteroatom is at least one type selected from the group consisting of an oxygen atom and a sulfur atom.

3. The adhesive composition according to claim 1, wherein the $X_1$ moiety and the $X_2$ moiety are sulfur atoms, and the $R_1$ moiety and the $R_2$ moiety are unsubstituted or ester bond-containing alkyl groups.

4. The adhesive composition according to claim 1, wherein the $X_1$ moiety and the $X_2$ moiety are oxygen atoms, and the $R_1$ moiety and the $R_2$ moiety are carbonyl group-containing alkyl groups.

5. The adhesive composition according to claim 1, wherein a content of the dimethyl tin catalyst is from 0.001 to 0.3 parts by mass per 100 parts by mass of the urethane prepolymer.

6. The adhesive composition according to claim 1, wherein the aliphatic isocyanate A is at least one type of hexamethylene diisocyanate-modified product selected from the group consisting of reaction products of hexamethylene diisocyanate and a polyol having tri- or higher functionality, allophanates of hexamethylene diisocyanate, isocyanurates of hexamethylene diisocyanate, and biurets of hexamethylene diisocyanate.

7. The adhesive composition according to claim 1, wherein the aminosilane compound B contains an imino group, and the imino group bonds to at least one aromatic hydrocarbon group.

8. The adhesive composition according to claim 1, further comprising a tertiary amine.

9. The adhesive composition according to claim 1, wherein the preliminary composition further contains a filler.

10. The adhesive composition according to claim 1, wherein the preliminary composition further contains a plasticizer.

11. A method of producing an adhesive composition, the method comprising:
a mixing step 1 of mixing the urethane prepolymer, the aliphatic isocyanate A, and the aminosilane compound B to obtain a preliminary composition; and
a mixing step 2 of mixing the preliminary composition and the dimethyl tin catalyst to produce the adhesive composition described in claim 1.

12. The method of producing the adhesive composition according to claim 11, wherein, in the mixing step 1, at least one type selected from the group consisting of fillers and plasticizers is further mixed.

13. The method of producing the adhesive composition according to claim 11, wherein, in the mixing step 2, a tertiary amine is further mixed.

* * * * *